US011269052B2

(12) United States Patent
Lee et al.

(10) Patent No.: US 11,269,052 B2
(45) Date of Patent: Mar. 8, 2022

(54) SIGNAL PROCESSING METHOD

(71) Applicant: NATIONAL CHIAO TUNG UNIVERSITY, Hsinchu (TW)

(72) Inventors: Ta-Sung Lee, Hsinchu (TW); Yu-Chien Lin, New Taipei (TW); Yun-Han Pan, Taipei (TW)

(73) Assignee: National Chiao Tung University, Hsinchu (TW)

( * ) Notice: Subject to any disclaimer, the term of this patent is extended or adjusted under 35 U.S.C. 154(b) by 314 days.

(21) Appl. No.: 16/728,268

(22) Filed: Dec. 27, 2019

(65) Prior Publication Data

US 2020/0256949 A1 Aug. 13, 2020

(30) Foreign Application Priority Data

Feb. 13, 2019 (TW) .................................. 108104758
May 10, 2019 (TW) .................................. 108116291

(51) Int. Cl.
*G01S 7/35* (2006.01)
*G01S 13/06* (2006.01)
*G01S 13/00* (2006.01)

(52) U.S. Cl.
CPC ............ *G01S 7/352* (2013.01); *G01S 13/003* (2013.01); *G01S 13/06* (2013.01); *G01S 7/356* (2021.05)

(58) Field of Classification Search
CPC ........ G01S 7/352; G01S 13/003; G01S 13/06; G01S 7/356

(Continued)

(56) References Cited

U.S. PATENT DOCUMENTS 6,018,317 A * 1/2000 Dogan ....................... G01S 3/74
                                                        342/373
6,208,295 B1 * 3/2001 Dogan ....................... G01S 3/74
                                                        342/361
(Continued)

FOREIGN PATENT DOCUMENTS

CN         103323827 B     1/2015
JP         2012103132 A *  5/2012 ............... G01S 3/74

OTHER PUBLICATIONS

Y. L. Sit, et al., "Direction of arrival estimation using the MUSIC algorithm for a MIMO OFDM radar," in IEEE Radar Conference, Atlanta, GA, pp. 0226-0229, May 2012.

(Continued)

*Primary Examiner* — Bernarr E Gregory
*Assistant Examiner* — Nuzhat Pervin
(74) *Attorney, Agent, or Firm* — Rosenberg, Klein & Lee (57) ABSTRACT

A signal processing method is provided. First, at least one transmitted signal is output to at least one target, and the target reflects at least one reflected signal to receiving antennas, which then generate receiving signals upon receipt of the reflected signal. Next, the transmitted signal and each receiving signal are processed to generate processing signals. The processing signals are arranged in a form of matrix, to generate a channel coefficient matrix having M×N channel coefficient matrix blocks. Next, the channel coefficient matrix is divided into $N_{divide} \times M_{divide}$ secondary channel coefficient matrices, which are then substituted into a snapshot vector matrix equation to generate a snapshot vector matrix for calculating an angle of the target. The signal processing method can establish an optimal secondary channel coefficient matrix arrangement by using a special signal preprocessing manner, to improve the resolution and accuracy of the estimated angle parameter of the target.

10 Claims, 6 Drawing Sheets

(58) Field of Classification Search
USPC .......................................................... 342/149
See application file for complete search history.

(56) References Cited

U.S. PATENT DOCUMENTS

| | | | | |
|---|---|---|---|---|
| 6,215,983 | B1* | 4/2001 | Dogan | G01S 3/74 375/324 |
| 6,310,704 | B1* | 10/2001 | Dogan | G01S 3/74 398/9 |
| 6,535,666 | B1* | 3/2003 | Dogan | G01S 3/74 385/12 |
| 6,593,882 | B1* | 7/2003 | Kim | H04B 7/086 342/373 |
| 6,658,234 | B1* | 12/2003 | Dogan | G01S 3/74 342/373 |
| 6,697,633 | B1* | 2/2004 | Dogan | G01S 3/74 455/450 |
| 7,515,714 | B2* | 4/2009 | Orihashi | H04L 9/0858 380/255 |
| 7,590,527 | B2* | 9/2009 | Yasunaga | G10L 19/12 704/223 |
| 2006/0158374 | A1* | 7/2006 | Rahamin | H01Q 21/26 342/368 |
| 2011/0001656 | A1* | 1/2011 | Nakai | G01S 13/38 342/99 |
| 2015/0204972 | A1* | 7/2015 | Ku | G01S 13/931 342/156 |

OTHER PUBLICATIONS

M. SCHOOR & B. Yang, "High-resolution angle estimation for an automotive FMCW radar sensor," in Proc. Intern. Radar Symposium (IRS), Cologne, Germany, Sep. 2007.

G. D. Qin & B. X. Chen, "DOA estimation in MIMO radar based on coherent signal-subspace method," in IET International Communication Conference on Wireless Mobile and Computing (CCWMC), Shanghai, pp. 25-28, Nov. 2011.

J. Choi, et al., "High angular resolution estimation methods for vehicle FMCW radar," Proceedings of 2011 IEEE CIE International Conference on Radar, Chengdu, pp. 1868-1871, Oct. 2011.

Y. C. Lin, et al., "Low-complexity high-resolution parameter estimation for automotive MIMO radars", IEEE Access. p. 1-p. 13, Jul. 2019.

* cited by examiner

SIGNAL PROCESSING METHOD

This application claims priority for Taiwan patent application no. 108104758 filed on Feb. 13, 2019 and application no. 108116291 filed on May 10, 2019, the content of which is incorporated by reference in its entirely.

BACKGROUND OF THE INVENTION

1. Field of the Invention

The present invention relates to a signal processing technology, and more particular to a signal processing method, which can be employed so as to calculate target angle parameters with high resolution and accuracy.

2. Description of the Related Art

Radars first appeared during World War II. The original radars were used to detect objects flying in the air, such as fighters. With the advancement of radar technology and complete development of automation systems, the radar technology has been gradually applied in advanced driver assistance systems (ADAS), to detect information of the target objects in the vicinity of a vehicle, so that the ADAS can calculate a driving route of the vehicle according to the information of the target object detected by the radar.

The radar technology is used to send electromagnetic waves into the space, and after the electromagnetic waves are reflected by the target object in the space, the radar receives the reflected signal, so that the radar can analyze direction, distance, and relative velocity of the target object, according to the reflected signal. Therefore, the analysis of the reflected signal is quite important for obtaining the data of the target object, and how to analyze the data of the target object from the reflected signal becomes a key issue of the radar technology.

In recent years, most of the reflected signal analysis technologies use the angle estimation algorithm based on signal subspace, to analyze parameters of the target object. At present, most of the research resources only focused on how to reduce complexity of the angle estimation algorithm and solve the problem caused by coherent signals, rather than on pre-processing of the input signal to improve the estimation performance. Therefore, the improvement of the angle estimation algorithm for reflected signal analysis so far is stilled limited.

In order to effectively overcome the above-mentioned problem and drawback, the present invention discloses a radar signal preprocessing method to modify the autocorrelation matrix inputted into the radar parameter estimation algorithm as the proposed signal processing method of the present invention.

SUMMARY OF THE INVENTION

An objective of the present invention is to provide a signal processing method, which can generate secondary channel coefficient matrices by using a special signal preprocessing manner, to improve reflected signal analysis. Furthermore, the signal processing method can be used in cooperation with the conventional radar parameter estimation algorithm and also improve the radar parameter estimation algorithm, so as to effectively improve resolution and accuracy of an angle parameter of a target estimated by a device.

Another objective of the present invention is to provide a signal processing method, which can simplify a target parameter calculation method and effectively improve accuracy of velocity, distance and angle parameters of a target.

In order to achieve the objectives, the present invention provides a signal processing method including the following steps. First, at least one transmitted signal is transmitted to at least one target, and at least one reflected signal is reflected by the at least one target. Next, the at least one reflected signal is received by a plurality of receiving antennas, respectively. The plurality of receiving antennas generate a plurality of receiving signals. The signal processing is performed on the at least one transmitted signal and each of the plurality of receiving signals, to generate a plurality of processing signals. Next, the plurality of processing signals received by each of the plurality of receiving antennas are arranged in a form of matrix, to generate at least one channel coefficient matrix. Each of the plurality of receiving antennas corresponds to a channel coefficient matrix having M frames, and N processing signals are arranged as the channel coefficient matrix blocks in each of the plurality of frames, respectively, so as to make the channel coefficient matrix have M×N channel coefficient matrix blocks. A movement parameter of a target is thus calculated according to the channel coefficient matrix, and the movement parameter includes a relative velocity parameter and a relative distance parameter. Next, the at least one channel coefficient matrix block is divided into $N_{divide}$ frequency-domain channel matrices and $M_{divide}$ time-domain channel matrices in frequency domain and time domain, respectively, so that the channel coefficient matrix comprises $N_{divide} \times M_{divide}$ secondary channel coefficient matrices, and each of the plurality of secondary channel coefficient matrices has $N/N_{divide} \times M/M_{divide}$ channel coefficient matrix blocks. Next, the relative velocity parameter and relative distance parameter calculated according to the at least one channel coefficient matrix and a conventional parameter estimation algorithm (for example, a constant false alarm rate (CFAR) target detection method based on the two-dimensional fast Fourier transform spectrum), are substituted into a snapshot vector matrix equation, to obtain a snapshot vector matrix.

In an embodiment, the snapshot vector matrix equation is expressed as:

$$s_{u,i,m} = \sum_{k=0}^{N/N_{divide}-1} \left( \sum_{l=0}^{M/M_{divide}-1} (D_{i,m})_{k,l} \cdot e^{-j\frac{\hat{v}_u}{v_{max}}} \right) e^{j\frac{\hat{d}_u}{d_{max}}k}$$

$$D_{i,m} \in \mathbb{C}^{N/N_{divide} \times M/M_{divide}}$$

$$m = 1, 2, \ldots, N_{divide} M_{divide}$$

wherein $s_{u,i,m}$ is the snapshot vector matrix, $D_{i,m}$ is the secondary channel coefficient matrix, $\hat{d}_u$ is the relative distance parameter, $\hat{v}_u$ is the relative velocity parameter, $d_{max}$ is a maximal detectable relative distance parameter of the target, $v_{max}$ is a maximal detectable relative velocity parameter of the target, u denotes the u-th to-be-estimated target, i denotes the i-th receiving antenna, m denotes the m-th snapshot vector matrix, k,l is a coordinate of the channel coefficient matrix block belonged to the secondary channel coefficient matrix parameter.

In an embodiment, after the step of obtaining the snapshot vector matrix, the signal processing method further includes steps of performing a space smoothing algorithm, a frequency smoothing algorithm, and a forward-backward averaging algorithm on the snapshot vector matrix in a sequential order, to generate a forward-backward averaging parameter. And, substituting the forward-backward averaging parameter into an angle estimation algorithm, such as angle estimation algorithm based on estimating signal via rotational invariance techniques (ESPRIT), to estimate a first eigenvalue $\lambda_u$ and a first standard angle parameter $q_u$ for the assumption that there is only one target, and to estimate a second eigenvalue $\lambda_{u,1}$, a second standard angle parameter $q_{u,1}$, a third eigenvalue $\lambda_{u,2}$ and a third standard angle parameter $q_{u,2}$ for the assumption that there are two targets. Next, substituting these parameters into a determination equation, to determine the number of the target and the corresponding standard angle parameter; when it determines, according to a calculation result of the determination equation, that there are at least two targets, using the second standard angle parameter and the third standard angle parameter as standard angle parameters of the two targets; when it determines, according to a calculation result of the determination equation, that there are not at least two targets, using the first standard angle parameter as a standard angle parameter of the target.

In an embodiment, the determination equation is expressed as:

$$\begin{cases} H_u = 2 \text{ and } (Q_{u,1}, Q_{u,2}) = (q_{u,1}, q_{u,2}), \\ \quad \text{if } (|\lambda_u - \lambda_{u,1}| \geq \varepsilon_1 \text{ and } |\lambda_u - \lambda_{u,2}| \geq \varepsilon_1) \\ \quad \text{or } (|\lambda_u - \lambda_{u,1}| \leq \varepsilon_2 \text{ and } |\lambda_u - \lambda_{u,2}| \leq \varepsilon_2) \\ \quad \text{or } (||\lambda_u| - 1| \leq \varepsilon_3, ||\lambda_{u,1}| - 1| \leq \varepsilon_3 \text{ and } ||\lambda_{u,2}| - 1| \leq \varepsilon_3) \\ H_u = 1 \text{ and } Q_u = q_u, \text{ otherwise} \end{cases}$$

where $H_u$ is the determined number of target, $Q_{u,1}, Q_{u,2}$ is the standard angle parameters of the two targets if the equation determines that there are at least two targets, $Q_u$ is the standard angle parameter of the target if the equation determines that there are not at least two targets, $q_u$ is the first standard angle parameter, $q_{u,1}$ is the second standard angle parameter, $q_{u,2}$ is the third standard angle parameter, $\lambda_u$ is the first eigenvalue, $\lambda_{u,1}$ is the second eigenvalue, $\lambda_{u,2}$ is the third eigenvalue, and $\varepsilon_1, \varepsilon_2, \varepsilon_3$ are preset thresholds.

BRIEF DESCRIPTION OF THE DRAWINGS

The structure, operating principle and effects of the present invention will be described in detail by way of various embodiments, which are illustrated in the accompanying drawings.

DETAILED DESCRIPTION OF THE PREFERRED EMBODIMENTS

The following embodiments of the present invention are herein described in details with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. Regarding the drawings, the relative proportions and ratios of elements in the drawings may be enlarged or diminished in size for the sake of clarity and convenience. Such arbitrary proportions are only illustrative and not limiting in any way. The same reference numbers used in the drawings and description refer to the same or like parts.

It is to be acknowledged that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

Figure 1:
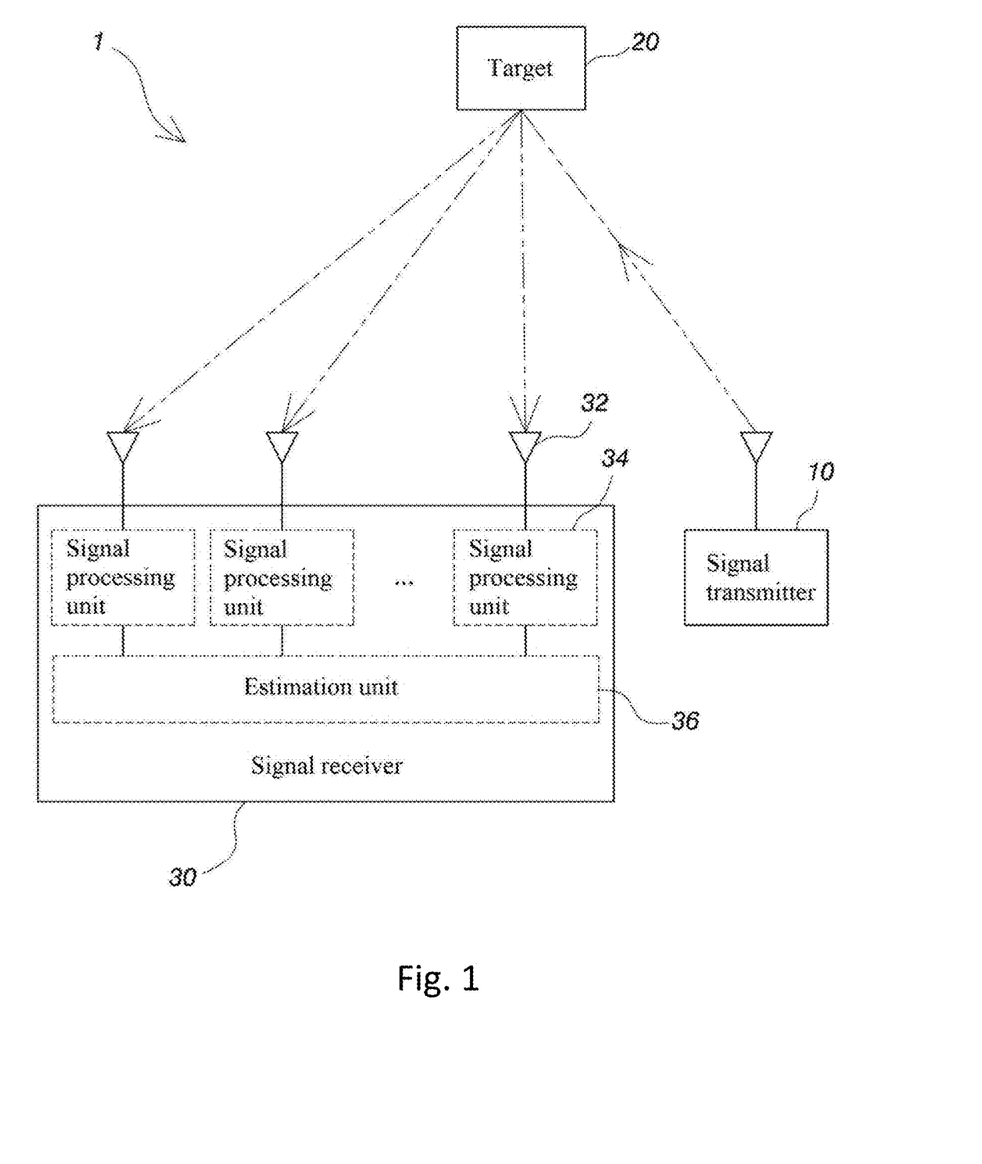
FIG. 1 is a system schematic block diagram when applying a signal processing method of the present invention.

Please refer to FIG. 1, which shows a system schematic block diagram when applying a signal processing method of the present invention. As shown in FIG. 1, a radar detection system 1 comprises a signal transmitter 10 and a signal receiver 30. For example, the signal transmitter 10 can be a frequency modulation continuous wave (FMCW) radar, an orthogonal frequency division multiplex (OFDM) radar, or other radar transmitting different types of signals. The signal transmitter 10 can output at least one transmitted signal to at least one target 20. The at least one target 20 reflects the transmitted signal and generates a reflected signal. The signal receiver 30 can receive the reflected signal reflected by the target 20, and perform signal analysis on the reflected signal to estimate information, such as a relative velocity and a relative distance of the target 20 to the signal transmitter 10, and a relative angle of the target 20.

The signal receiver 30 includes a plurality of receiving antennas 32, a plurality of signal processing units 34, and an estimation unit 36. The plurality of receiving antennas 32 are in a uniform linear array disposed on a surface of the signal receiver 30, and configured to receive the reflected signal. A distance 61 between the two adjacent receiving antennas 32 is the same as that of another two adjacent receiving antennas 32. Each receiving antennas 32 is connected to a signal processing unit 34. The signal processing unit 34 may comprise a signal processing unit, a low pass filter unit, an analog-to-digital conversion unit, a channel signal matrix calculation unit, and other necessary signal processing unit, such that the signal processing unit 34 can generate a receiving signal based on the reflected signal, and then perform subsequent signal processing, such as channel coefficient matrix processing, on the receiving signal. The plurality of signal processing units 34 are connected to the estimation unit 36, and the estimation unit 36 can estimate the information such as a relative velocity, a relative distance of the target 20 to the signal receiver 30 and a relative angle, according to the signal processed by the signal processing unit 34.

Figure 2:
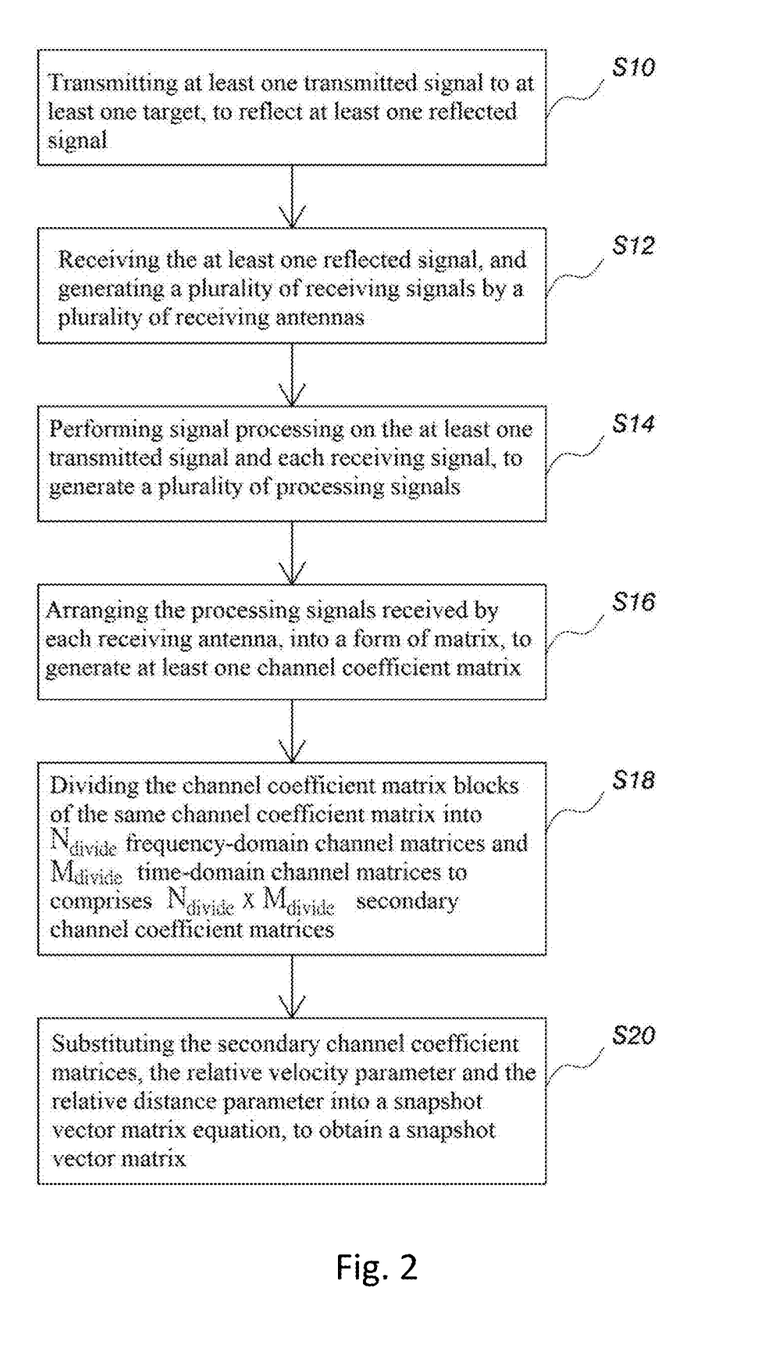
FIG. 2 is a flowchart of a signal processing method of the present invention.

After introduction of the system architecture to which the signal processing method of the present invention is applied, an operational flow of the signal processing method of the present invention will be illustrated in details with reference to FIGS. 1 and 2. First, in a step S10, the signal transmitter 10 outputs the at least one transmitted signal to the target 20, so that the target 20 reflects the transmitted signal and generate the at least one reflected signal to the signal receiver 30. Next, in a step S12, each of the plurality of receiving antennas 32 of the signal receiver 30 receives the at least one reflected signal, and then transmits the reflected signal to the signal processing unit 34 corresponding thereto, and each of the plurality of signal processing units 34 generates the receiving signal, wherein the receiving signal is expressed as the following equation (1):

$$s_R(t) = b_0 \left\{ \sum_{l=0}^{M-1} e^{j2\pi \left[f_c + \frac{B}{T_c}\left(\frac{t-lT_c}{2}-\tau\right)+f_D\right](t-lT_c)} \right.$$
$$\left. e^{j2\pi f_D T_c l}[u(t-\tau-lT_c) - u(t-\tau-(l+1)T_c)] \right\} \phi(i)e^{j\varphi_0} \quad (1)$$

wherein, $s_R(t)$ is the receiving signal, $b_0$ is attenuation of the receiving signal, $l$ is a coordinate of the channel coefficient matrix block belonged to the channel coefficient matrix, $f_D$ is a Doppler shift caused by the relative velocity of the target, $f_c$ is a carrier frequency, $t$ is time, $T_c$ is a duration of frequency modulation continuous wave (FMCW) signal, B is a frequency-sweep bandwidth, $\varphi_0$ is a random phase difference, $\emptyset(i)$ is a spatial phase difference of the i-th receiving antenna relative to the first receiving antenna.

Next, in a step S14, each of the plurality of signal processing units 34 performs signal processing on the transmitted signal with respect to each of the plurality of receiving signals. When the receiving signal is an OFDM signal, the signal processing units 34 can perform the conventional signal processing manner corresponding to the OFDM signal, on the transmitted signal and the receiving signals. In this embodiment, for example, the receiving signal is an FMCW signal, so a signal mixing process is performed on the transmitted signal while the signal processing is performed on the receiving signal, thereby generating the processing signal which can be expressed as the following equation (2):

$$s_{R,i,sample}(k,l) = s_{R,i,mix}(t)\big|_{t=lT_c+k\frac{T_c}{N}} = b_0 e^{-j2\pi\left(\frac{B}{T_c}\tau\right)kT_c} e^{j2\pi f_D T_c l} \phi(i)e^{j\varphi_0} \quad (2)$$

$$s_{R,i,mix}(t) = s_{R,i}(t)s_T^*(t)$$

wherein, $s_{R,i,sample}$ is the processing signal, N is the number of sampling times in a chirp signal period, k,l is the coordinate of the channel coefficient matrix block belonged to the channel coefficient matrix, $b_0$ is attenuation of the receiving signal, $T_c$ is a duration of frequency modulation continuous wave (FMCW) signal, B is a frequency-sweep bandwidth, $s_T(t)$ is the transmitted signal.

Figure 3:
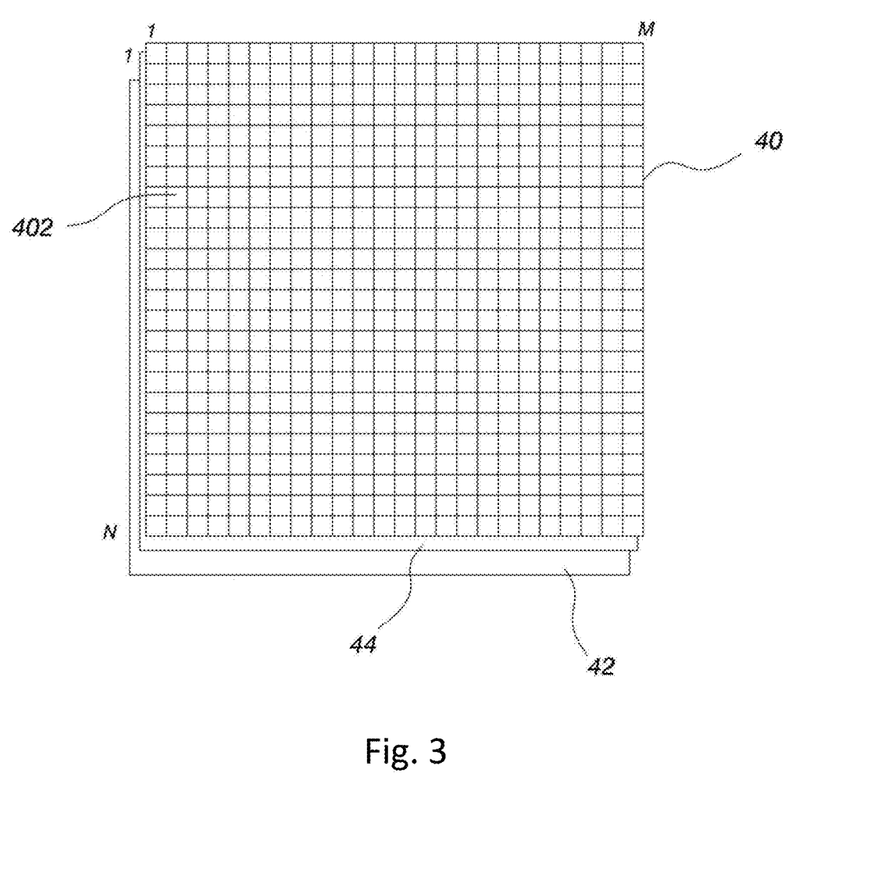
FIG. 3 is a schematic view of a channel coefficient matrix of the present invention.

Next, the signal processing method of the present invention enters a step S16. Please also refer to FIG. 3. Each of the plurality of signal processing units 34 arranges the processing signal, received by the receiving antenna 32 corresponding thereto, into a form of matrix, so as to generate the at least one channel coefficient matrix. In detail, each receiving antenna 32 generates channel coefficient matrices 40, 42, and 44, respectively, and the manners of generating the channel coefficient matrices 40, 42 and 42 are the same, so this embodiment uses the channel coefficient matrix 40 as an example for illustration. The signal processing unit 34 can divide the channel coefficient matrix 40 into M frames, and the N processing signals are sequentially arranged as the channel coefficient matrix in each frame, so that the channel coefficient matrix can have M×N channel coefficient matrix blocks 402, and the channel coefficient matrix block 402 can be expressed as the following equation (3):

$$(F_i)_{k,l} = b_0 \cdot e^{j2\pi f_D T_c l} \cdot e^{-j2\pi\left(\frac{B}{T_c}\tau\right)kT_s} \cdot e^{j\varphi_0} \cdot e^{j\emptyset(i)} \in \mathbb{C}^{N \times M} \quad (3)$$

wherein, $(F_i)_{k,l}$ is a k-th frequency domain and l-th channel coefficient matrix block in the channel coefficient matrix, $b_0$ is attenuation of the receiving signal, $T_c$ is a duration of frequency modulation continuous wave (FMCW) signal, $T_s$ is a sampling cycle, $f_D$ is a Doppler shift caused by the relative velocity of the target.

In the signal processing method of the present invention, after the channel coefficient matrix is generated in the step S16, the estimation unit 36 estimates a relative velocity parameter, a relative distance parameter and a reference angle parameter by using the conventional estimation method, and the estimation process is described in following sections. The estimation unit 36 can perform two-dimensional fast Fourier transform on the channel coefficient matrix 40 of one of the receiving antennas 32, to form a time-frequency channel response matrix, and then substitute the time-frequency channel response matrix into a peak-value detection algorithm, so as to generate a movement parameter of the target 20. The movement parameter includes the relative velocity parameter $\hat{v}_u$ and the relative distance parameter $\hat{d}_u$ of the target 20. Next, the estimation unit 36 then performs one-dimensional fast Fourier transform on the time-frequency channel response matrix block corresponding to the relative velocity parameter and the relative distance parameter for different antennas, to generate the reference angle parameter $\hat{\theta}_u$ of the target.

Figure 4:
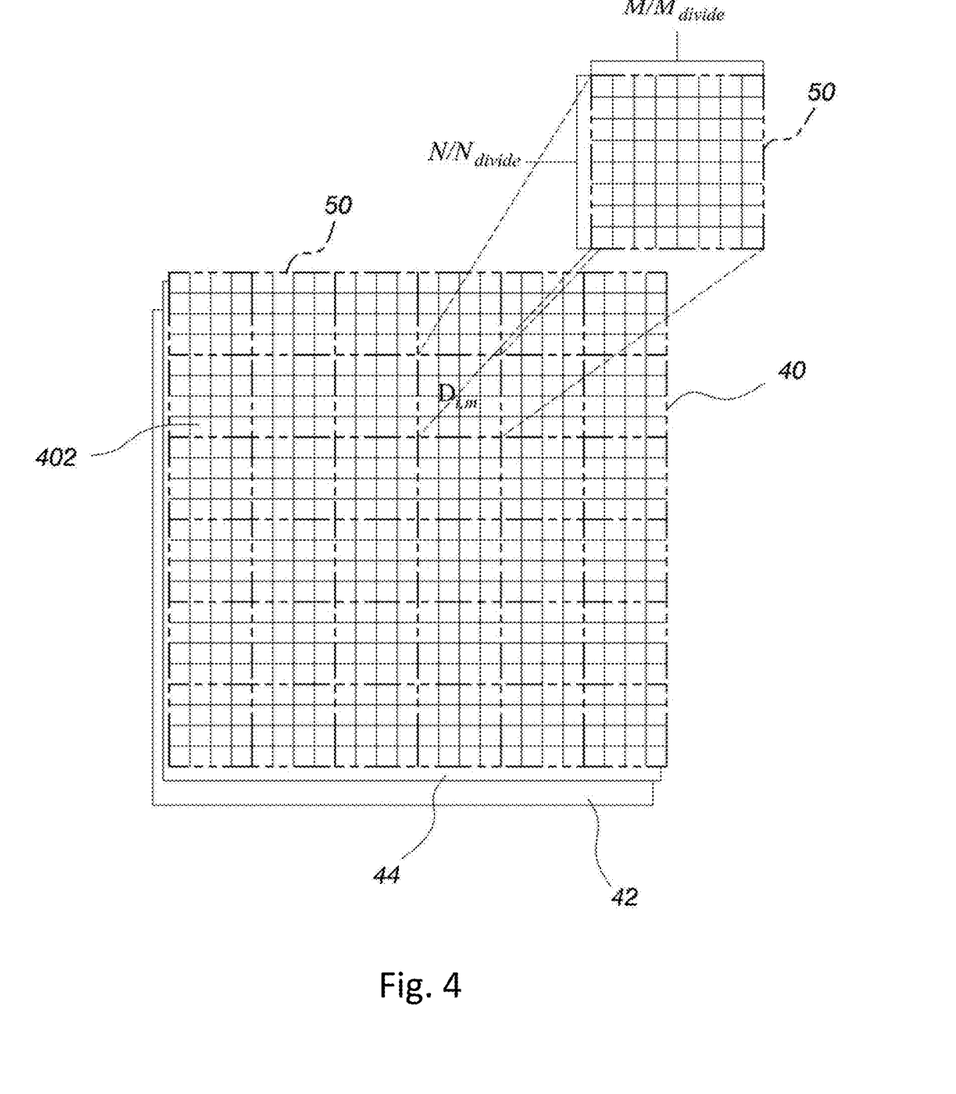
FIG. 4 is a schematic view of a divided channel coefficient matrix of the present invention.

After the channel coefficient matrix 40 is generated, the method enters a step S18. Meanwhile, please refer to FIG. 4. In the step S18, the channel coefficient matrix 40 is divided into $N_{divide}$ frequency-domain channel matrices and $M_{divide}$ time-domain channel matrices based on frequency domain and time domain, so that the channel coefficient matrix comprises $N_{divide} \times M_{divide}$ secondary channel coefficient matrices 50, and each of the secondary channel coefficient matrices 50 comprises $N/N_{divide} \times M/M_{divide}$ channel coefficient matrix blocks 402. Next, in a step S20, the divided channel coefficient matrix blocks 50 of the channel coefficient matrix 40, and the relative velocity parameter $\hat{v}_u$ and relative distance parameter $\hat{d}_u$ estimated by the above-mentioned conventional radar algorithm are substituted in a snapshot vector matrix equation which is expressed as the following equation (4):

$$s_{u,i,m} = \sum_{k=0}^{N/N_{divide}-1} \left( \sum_{l=0}^{M/M_{divide}-1} (D_{i,m})_{k,l} \cdot e^{-j\frac{\hat{v}_u}{v_{max}} l} \right) e^{j\frac{\hat{d}_u}{d_{max}} k} \quad (4)$$

$$D_{i,m} \in \mathbb{C}^{N/N_{divide} \times M/M_{divide}}$$

$$m = 1, 2, \ldots, N_{divide} M_{divide}$$

wherein, $s_{u,i,m}$ is a snapshot vector matrix, $D_{i,m}$ is the secondary channel coefficient matrix, u denotes the u-th to-be-estimated target, i denotes the i-th receiving antenna, k,l is a coordinate of the channel coefficient matrix block belonged to the channel coefficient matrix, m denotes the m-th snapshot vector matrix, $\hat{d}_u$ is the relative distance parameter of the u-th target estimated by the conventional radar algorithm, $\hat{v}_u$ is the relative velocity parameter of the u-th target, $d_{max}$ is a maximal detectable relative distance parameter of the target, $v_{max}$ is a maximal detectable relative velocity parameter of the target, $N_{divide}$ and $M_{divide}$ are time-domain channel matrix and frequency-domain channel matrix, respectively. For example, the snapshot vector matrix equation (4) is performed on the secondary channel coefficient matrix $D_{i,m}$ 50 of the i-th receiving antenna 32, wherein $D_{i,m} \in \mathbb{C}^{N/N_{divide} \times M/M_{divide}}$, and is belonged to the p-th sub-frequency band when m=1+(p-1)$M_{divide}$,2+(p-1)$M_{divide}$, ..., p$M_{divide}$. The movement parameter of the u-th to-be-estimated target, found by the conventional method, such as the two-dimensional fast Fourier transform algorithm, can be substituted into the snapshot vector matrix equation (4), so as to avoid complex calculation of using the two-dimensional fast Fourier transform algorithm to re-search the movement parameter of the u-th to-be-estimated target in each secondary channel coefficient matrix during the angle calculation in the convention method. For the u-th to-be-estimated target, the $N_{divide} \times M_{divide}$ snapshot vector $s_{u,m}=[s_{u,1,m},s_{u,2,m}, \ldots, s_{u,N_R,m}]^T$ having a processing gain of $10 \log((N \cdot M)/(N_{divide} \cdot M_{divide}))$, can be generated to serve as the input signal of the signal subspace angle estimation algorithm in the snapshot vector matrix $S_{u,p}=[s_{u,1+(p-1)M_{divide}}, s_{u,2+(p-1)M_{divide}}, \ldots, s_{u,pM_{divide}}] \in \mathbb{C}^{N_R \times M_{divide}}$ of the p-th sub-frequency band.

Figure 5:
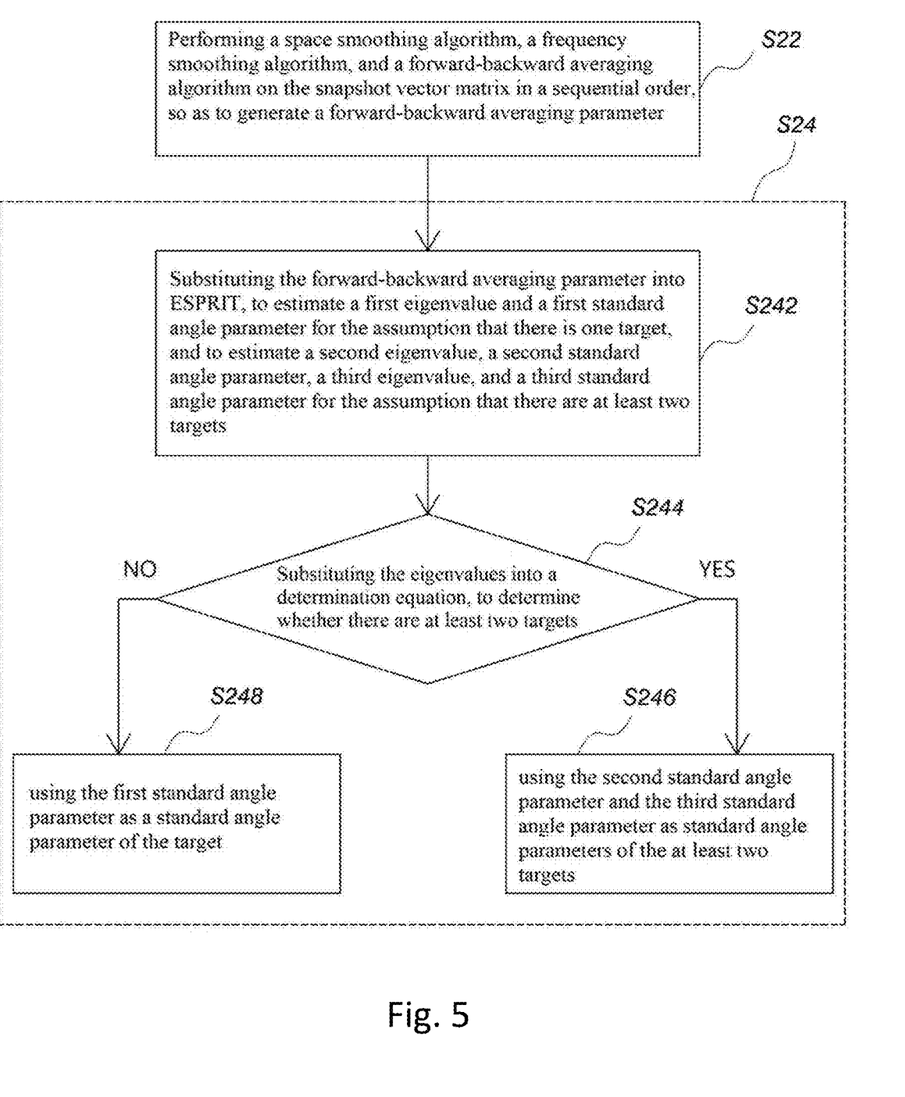
FIG. 5 is a flowchart of an operation of calculating a standard angle parameter according to the present invention.

Please refer to FIG. 5, which illustrates how to use the snapshot vector matrix to calculate the relative angle of the target. As shown in a step S22, a space smoothing algorithm, a frequency smoothing algorithm, and a forward-backward averaging algorithm are performed on the snapshot vector matrix in a sequential order, to generate the forward-backward averaging parameter. In detail, when the space smoothing algorithm is performed, the different L array groups in which each includes continuous $N_{R,sub}$ receiving antennas on the signal receiver 30 is found first, wherein $L=N_R-N_{R,sub}+1$, $N_{R,sub}(N_{R,sub} \leq N_R)$, and $N_R$ is a total amount of the receiving antennas 32. Next, the snapshot vector matrix $S_{u,p}$ of each sub-frequency band is divided into L snapshot vector matrices, and each snapshot vector matrix can be expressed as the following equation (5):

$$S_{u,p,ll} = [0_{N_{R,sub} \times (ll-1)} \vdots I_{N_{R,sub} \times N_{R,sub}} \vdots 0_{N_{R,sub} \times (L-ll)}]_{N_{R,sub} \times N_R^H}$$

$$[s_{u,1+(p-1)M_{divide}} \vdots s_{u,2+(p-1)M_{divide}} \vdots \cdots \vdots s_{u,pM_{divide}}]_{N_R \times M_{divide}} \quad (5)$$

wherein 0 is a zero matrix, I is an unit matrix, ll is a sequence of the number of the sub-arrays, and a matrix size of the equation (5) is $N_{R,sub} \times M_{divide}$, and the snapshot vector matrix is then used to generate the corresponding autocorrelation matrix $R_{u,p,ll}=S_{u,p,ll}S_{u,p,ll}^H/M_{divide}$, and the autocorrelation matrix of the p-th sub-frequency band is arranged according to mathematical formula, to derive the following equation (6):

$$R_{u,p} = \sum_{ll=1}^{L} R_{u,p,ll}/L \quad (6)$$

Next, the frequency smoothing algorithm is performed, and $R_{u,p}$ is substituted into the frequency smoothing algorithm. The frequency smoothing algorithm can be expressed as the following equation (7):

$$R_u = \sum_{p=1}^{N_{divide}} T_p(\hat{\theta}_u) R_{u,p} T_p^H(\hat{\theta}_u)/N_{divide} \quad (7)$$

where $R_u$ is an autocorrelation matrix of the u-th target calculated by the spatial smoothing and frequency smoothing algorithm, $T_p(\hat{\theta}_u)$ is a focusing matrix of the p-th sub-frequency band, $\hat{\theta}_u$ is an angle vector corresponding to the u-th target and calculated by the conventional peak-value detection algorithmic method. Next, $R_u$ is substituted into the forward-backward averaging algorithm which helps to remove the influence of coherent signals of $R_u$, so as to generate the autocorrelation matrix as the signal subspace angle estimation algorithm, and the equation (8) is expressed as follows:

$$R_{u,FBA} = \frac{1}{2}(R_u + LR_u^*L) \quad (8)$$

$$L = \begin{bmatrix} 0 & \cdots & 0 & 1 \\ 0 & \cdots & 1 & 0 \\ \vdots & \ddots & \vdots & \vdots \\ 1 & \cdots & 0 & 0 \end{bmatrix}$$

wherein, $R_{u,FBA}$ is the forward-backward averaging parameter.

In a step S24, for the u-th to-be-estimated target, $R_{u,FBA}$ is substituted into the angle estimation algorithm, to obtain an accurate number of the estimated target and the corresponding standard angle parameters. The angle estimation algorithm can use the angle estimation algorithm based on estimating signal via rotational invariance techniques (ESPRIT).

The operation of the step S24 is described in detail below. First, in a step S242, the forward-backward averaging parameter $R_{u,FBA}$ is substituted into the angle estimation algorithm based on ESPRIT, to estimate a first eigenvalue $\lambda_u$ and a first standard angle parameter $q_u$ for the assumption that there is only one target, and to estimate a second eigenvalue $\lambda_{u,1}$, a second standard angle parameter $q_{u,1}$, a third eigenvalue $\lambda_{u,2}$, and a third standard angle parameter $q_{u,2}$ for the assumption that there are two targets. Next, in a step S244, the first eigenvalue $\lambda_u$, the second eigenvalue $\lambda_{u,1}$ and the third eigenvalue $\lambda_{u,2}$ are substituted into an determination equation, to determine whether there are two targets. The determination equation (9) is expressed as follows:

$$\begin{cases} H_u = 2 \text{ and } (Q_{u,1}, Q_{u,2}) = (q_{u,1}, q_{u,2}), \\ \quad \text{if } (|\lambda_u - \lambda_{u,1}| \geq \varepsilon_1 \text{ and } |\lambda_u - \lambda_{u,2}| \geq \varepsilon_1) \\ \quad \text{or } (|\lambda_u - \lambda_{u,1}| \leq \varepsilon_2 \text{ and } |\lambda_u - \lambda_{u,2}| \leq \varepsilon_2) \\ \quad \text{or } (||\lambda_u| - 1| \leq \varepsilon_3, ||\lambda_{u,1}| - 1| \leq \varepsilon_3 \text{ and } ||\lambda_{u,2}| - 1| \leq \varepsilon_3) \\ H_u = 1 \text{ and } Q_u = q_u, \text{ otherwise} \end{cases} \quad (9)$$

wherein $H_u$ is the determined number of target, $Q_{u,1}, Q_{u,2}$ is the standard angle parameters of the two targets if the equation determines that there are at least two targets, $Q_u$ is the standard angle parameter of the target if the equation determines that there are not at least two targets, $q_u$ is the first standard angle parameter, $q_{u,1}$ is the second standard angle parameter, $q_{u,2}$ is the third standard angle parameter, $\lambda_u$ is the first eigenvalue, $\lambda_{u,1}$ is the second eigenvalue, $\lambda_{u,2}$ is the third eigenvalue, $\varepsilon_1$, $\varepsilon_2$ and $\varepsilon_3$ are different preset thresholds, $\varepsilon_1$ and $\varepsilon_2$ can be 0.01, and $\varepsilon_3$ can be 0.05.

According to the above determination equation (9) and the eigenvalues, it is determined whether there are two targets if it determines that there are two targets, the method of the present invention enters a step S246, and in a condition that there are two targets, the second standard angle parameter $q_{u,1}$ and third standard angle parameter $q_{u,2}$ are defined as the standard angle parameters of the two targets. Otherwise, the method enters a step S248, indicating there is only one target, and in such condition when there is only one target, the first standard angle parameter $q_u$ is defined as the standard angle parameter of the target. As a result, the signal processing method of the present invention is able to determine effectively whether the standard angle values estimated by the angle estimation algorithm based on ESPRIT are the angles of the same target or the angles of different targets, so as to solve the problems that it was hard to determine, after the calculation of standard angle parameters, whether the two angles belong to the same target.

Furthermore, regarding to the setting of the frequency domain as well as time domain division constants of the system., it is suggested that $(B/N_{divide})/f_c$ must be less than 0.01 to maintain the narrow-band assumption of the frequency smoothing process in each sub frequency band, and $N_{divide} \times M_{divide}$ must be at least larger than two times of number of the receiving antennas. It should be noted that, when the amount of divided matrices in time domain and frequency domain is less, the secondary channel coefficient matrix includes more channel coefficient matrix blocks. Although the quality of each snapshot vector matrix is increased (that is, a high processing gain causes a high signal-to-noise ratio), nevertheless, less snapshot vector matrices cause failure of creating a full-rank auto-covariance matrix as the input of the signal subspace angle estimation algorithm, and it results in a wrong noise subspace. On the other hand, when the amount of divided matrices in time domain and frequency domain is increasing, more snapshot vector matrices can be generated. However, the quality of the snapshot vector matrices is reduced, (that is, a low processing gain causes a low signal-to-noise ratio), and it leads the signal subspace angle estimation algorithm to find the wrong noise subspace, and causes decline of the resolution and accuracy of the angle. Therefore, the amount of divided matrices in time domain and frequency domain must refer to the amount of resources of the actual system, such as the amount N·M of matrix blocks. The recommended selection is to maximize the processing gain $10 \log((N \cdot M)/(N_{divide} \cdot M_{divide}))$. of the receiver in consideration of the amount of antennas used in the system and the acceptable snapshot amount $N_{divide} \cdot M_{divide}$. According to the constant setting recommended above, the user can select the appropriate constant values to achieve the best angle estimation performance.

Figure 6A:
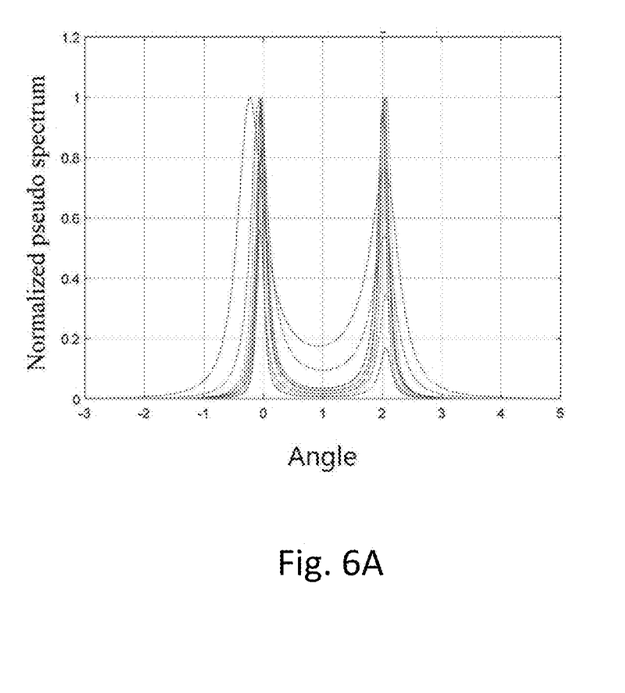
FIG. 6A is a signal analysis diagram generated by the signal processing method of the present invention.
Figure 6B:
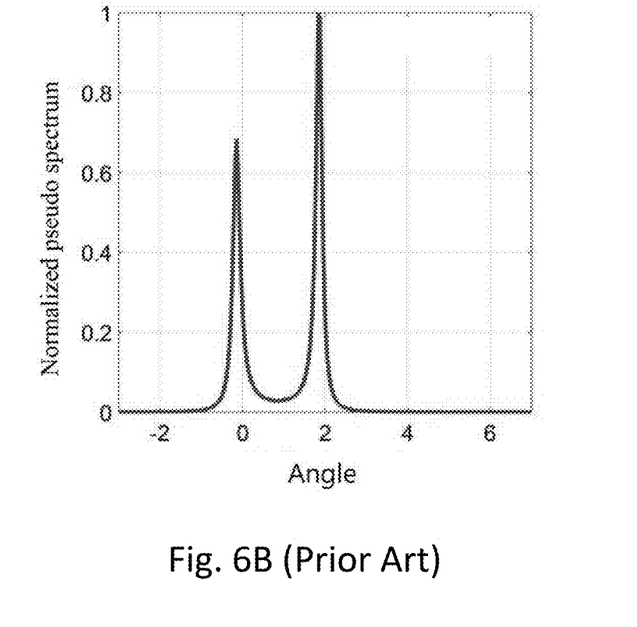
FIG. 6B is a signal analysis diagram generated by a conventional method.

Please refer to FIGS. 6A and 6B. FIG. 6A is a signal analysis diagram estimated by the signal processing method of the present invention, comprising the steps S10 to S20, and FIG. 6B is signal analysis diagram estimated by the conventional estimation methods. As shown in FIGS. 6A and 6B, it can be seen that there is almost no difference in the signal waveforms. However, the calculation process of the signal processing method of the present invention is simpler than that of the conventional method, and the proposed method can be used to simplify the target parameter calculation method and further improve the resolution of the parameters of the target, thereby effectively enhancing accuracy of the angle parameters of the target.

According to the above-mentioned contents, the signal processing method of the present invention is aimed to generate a secondary channel coefficient matrix by using the special signal pre-processing manner, and to improve the ability of analyzing the reflected signal. The signal processing method of the present invention can be utilized in cooperation with a conventional radar parameter estimation algorithm for further improving the parameter estimation algorithm, so as to effectively improve the resolution and accuracy of the angle parameter of the target estimated by the device. As a result it simplifies the target parameter calculation method and effectively improves the accuracy of the angle parameters of the target.

The present invention disclosed herein has been described by means of specific embodiments. However, numerous modifications, variations and enhancements are allowed to be made thereto by those skilled in the art without departing from the spirit and scope of the disclosure set forth in the claims.

What is claimed is:

1. A signal processing method, comprising:
   transmitting at least one transmitted signal to at least one target to reflect at least one reflected signal;
   receiving the at least one reflected signal, and generating a plurality of receiving signals by a plurality of receiving antennas;
   performing signal processing on the at least one transmitted signal and each of the plurality of receiving signals, to generate a plurality of processing signals;
   arranging the processing signals received by each of the plurality of receiving antennas into a form of matrix, to generate at least one channel coefficient matrix, wherein each of the plurality of receiving antennas corresponds to one of the at least one channel coefficient matrix, the corresponding channel coefficient matrix comprises M frames, and N processing signals are sequentially arranged as the channel coefficient matrix blocks in each of the M frames, so that the channel coefficient matrix comprises M×N channel coefficient matrix blocks, a movement parameter of the target is calculated according to the channel coefficient matrix, and the movement parameter comprises a relative velocity parameter and a relative distance parameter;
   dividing the at least one channel coefficient matrix, based on frequency domain and the time domain, into $N_{divide}$ frequency-domain channel matrices and $M_{divide}$ time-domain channel matrices, respectively, wherein the at least one channel coefficient matrix comprises $N_{divide} \times M_{divide}$ secondary channel coefficient matrices, and each of the plurality of secondary channel coefficient matrices comprises $N/N_{divide} \times M/M_{divide}$ channel coefficient matrix blocks; and substituting the secondary channel coefficient matrices, the relative velocity parameter and the relative distance parameter into a snapshot vector matrix equation, to obtain a snapshot vector matrix with a processing gain of $10 \log((N \cdot M)/(N_{divide} \cdot M_{divide}))$ dB.

2. The signal processing method according to claim 1, wherein the snapshot vector matrix equation is expressed as:

$$s_{u,i,m} = \sum_{k=0}^{N/N_{divide}-1} \left( \sum_{l=0}^{M/M_{divide}-1} (D_{i,m})_{k,l} \cdot e^{-j\frac{\hat{v}_u}{v_{max}}} \right) e^{j\frac{\hat{d}_u}{d_{max}}k}$$

$$D_{i,m} \in \mathbb{C}^{N/N_{divide} \times M/M_{divide}}$$

$$m = 1, 2, \ldots, N_{divide} M_{divide}$$

wherein $s_{u,i,m}$ is the snapshot vector matrix, $D_{i,m}$ is the secondary channel coefficient matrix, $\hat{d}_u$ is the relative distance parameter calculated by using a conventional radar parameter estimation algorithm, $\hat{v}_u$ is the relative velocity parameter, $d_{max}$ is a maximal detectable relative distance parameter of the target, $v_{max}$ is a maximal detectable relative velocity parameter of the target, u denotes the u-th to-be-estimated target, i denotes the i-th receiving antenna, m denotes the m-th snapshot vector matrix, and k,l is a coordinate of the channel coefficient matrix block belonged to the channel coefficient matrix.

3. The signal processing method according to claim 1, after the step of obtaining the snapshot vector matrix, further comprising:

performing a space smoothing algorithm, a frequency smoothing algorithm, and a forward-backward averaging algorithm on the snapshot vector matrix in a sequential order, so as to generate a forward-backward averaging parameter; and substituting the forward-backward averaging parameter into an angle estimation algorithm, to estimate a standard angle parameter of the target.

4. The signal processing method according to claim 3, wherein the step of substituting the forward-backward averaging parameter into the angle estimation algorithm to estimate the standard angle parameter of the target, further comprises:

substituting the forward-backward averaging parameter into an angle estimation algorithm based on estimating signal via rotational invariance techniques (ESPRIT), to estimate a first eigenvalue and a first standard angle parameter for an assumption that there is one target, and to estimate a second eigenvalue, a second standard angle parameter, a third eigenvalue, and a third standard angle parameter for an assumption that there are at least two targets; and substituting the first eigenvalue, the second eigenvalue, and the third eigenvalue into a determination equation, to determine whether there are at least two targets;

when it is determined that there are at least two targets, using the second standard angle parameter and the third standard angle parameter as standard angle parameters of the at least two targets; and when it is determined that there are not at least two targets, using the first standard angle parameter as a standard angle parameter of the target.

5. The signal processing method according to claim 4, wherein the determination equation is expressed as:

$$\begin{cases} H_u = 2 \text{ and } (Q_{u,1}, Q_{u,2}) = (q_{u,1}, q_{u,2}), \\ \quad \text{if } (|\lambda_u - \lambda_{u,1}| \geq \varepsilon_1 \text{ and } |\lambda_u - \lambda_{u,2}| \geq \varepsilon_1) \\ \quad \text{or } (|\lambda_u - \lambda_{u,1}| \leq \varepsilon_2 \text{ and } |\lambda_u - \lambda_{u,2}| \leq \varepsilon_2) \\ \quad \text{or } (||\lambda_u| - 1| \leq \varepsilon_3, ||\lambda_{u,1}| - 1| \leq \varepsilon_3 \text{ and } ||\lambda_{u,2}| - 1| \leq \varepsilon_3) \\ H_u = 1 \text{ and } Q_u = q_u, \text{ otherwise} \end{cases}$$

wherein $H_u$ is the determined number of target, $Q_{u,1}, Q_{u,2}$ is the standard angle parameters of the two targets if the equation determines that there are at least two targets, $Q_u$ is the standard angle parameter of the target if the equation determines that there are not at least two targets, $q_u$ is the first standard angle parameter, $q_{u,1}$ is the second standard angle parameter, $q_{u,2}$ is the third standard angle parameter, $\lambda_u$ is the first eigenvalue, $\lambda_{u,1}$ is the second eigenvalue, $\lambda_{u,2}$ is the third eigenvalue, and $\varepsilon_1$, $\varepsilon_2$ and $\varepsilon_3$ are preset thresholds.

6. The signal processing method according to claim 1, wherein the step of calculating the movement parameter of the target according to the channel coefficient matrix, further comprises:

performing two-dimensional fast Fourier transforms on the at least one channel coefficient matrix, to form a time-frequency channel response matrix, and substituting the time-frequency channel response matrix into a peak-value detection algorithm to generate the movement parameter of the target, wherein the movement parameter comprises the relative velocity parameter and the relative distance parameter; and performing one-dimensional fast Fourier transform on the time-frequency channel response matrix block of the different receiving antennas corresponding to the relative velocity parameter and the relative distance parameter, to generate a reference angle parameter of the target.

7. The signal processing method according to claim 1, wherein the receiving signal is expressed as:

$$s_R(t) = b_0 \left\{ \sum_{l=0}^{M-1} e^{j2\pi \left[ f_c + \frac{B}{T_c} \left( \frac{t-lT_c}{2} - \tau \right) + f_D \right](t-lT_c)} \right.$$

$$\left. e^{j2\pi f_D T_c l} [u(t-\tau-lT_c) - u(t-\tau-(l+1)T_c)] \right\} \phi(i) e^{j\varphi_0}$$

wherein, $s_R(t)$ is the receiving signal, $b_0$ is attenuation of the receiving signal, l is a coordinate of the channel coefficient matrix block belonged to the channel coefficient matrix, $f_D$ is a Doppler shift caused by a relative velocity of the target, $f_c$ is a carrier frequency, t is time, $T_c$ is a duration of frequency modulation continuous wave (FMCW) signal, B is a frequency-sweep bandwidth, φ₉ is a random phase difference, and Ø(i) is a spatial phase difference of the i-th receiving antenna relative to the first receiving antenna.

8. The signal processing method according to claim 1, wherein the processing signal is expressed as:

$$s_{R,i,sample}(k, l) = s_{R,i,mix}(t)\big|_{t=lT_c+k\frac{T_c}{N}} = b_0 e^{-j2\pi\left(\frac{B}{T_c}\tau\right)kT_c} e^{j2\pi f_D T_c l} \phi(i) e^{j\varphi_0}$$

$$s_{R,i,mix}(t) = s_{R,i}(t)s_T^*(t)$$

wherein $s_{R,i,sample}$ is the processing signal, N is the number of sampling times in a chirp signal period, k,l is a coordinate of the channel coefficient matrix block belonged to the channel coefficient matrix, $b_0$ is attenuation of the receiving signal, B is a frequency-sweep bandwidth, $T_c$ is a duration of frequency modulation continuous wave (FMCW) signal, and $s_T(t)$ is the transmitted signal.

9. The signal processing method according to claim 1, wherein the channel coefficient matrix parameter is expressed as:

$$(F_i)_{k,l} = b_0 \cdot e^{j2\pi f_D T_c l} \cdot e^{-j2\pi\left(\frac{B}{T_c}\tau\right)kT_s} \cdot e^{j\varphi_0} \cdot e^{j\phi(i)} \in \mathbb{C}^{N \times M}$$

wherein $(F_i)_{k,l}$ is the k-th frequency domain and l-th time domain channel coefficient matrix block in the channel coefficient matrix, $b_0$ is attenuation of the receiving signal, $T_c$ is a duration of frequency modulation continuous wave (FMCW) signal, $T_s$ is a sampling cycle, $f_D$ is a Doppler shift caused by a relative velocity of the target.

10. The signal processing method according to claim 1, wherein in the step of performing signal processing on the transmitted signal and each of the plurality of receiving signals, when the receiving signal is a frequency modulation continuous wave (FMCW) signal, a signal mixing process is performed on each of the plurality of receiving signals.

* * * * *